Oct. 9, 1934.  C. C. HANSEN  1,975,845
VALVE FOR COMPRESSORS
Filed May 1, 1930

INVENTOR.
Charles C. Hansen.
BY
HIS ATTORNEY.

Patented Oct. 9, 1934

1,975,845

UNITED STATES PATENT OFFICE 1,975,845

VALVE FOR COMPRESSORS

Charles C. Hansen, Easton, Pa., assignor to Ingersoll-Rand Company, Jersey City, N. J., a corporation of New Jersey Application May 1, 1930, Serial No. 448,928

5 Claims. (Cl. 277—20)

This invention relates to compressors, but more particularly to valves for compressors.

It is an object of this invention to construct a valve for compressors which shall be compact and durable. Another object is to enable the construction of compressor valves to be simplified.

Other objects will be in part obvious and in part pointed out hereinafter.

In the drawing, Figure 1 is a plan view of the valve partly in section.

Figure 1:
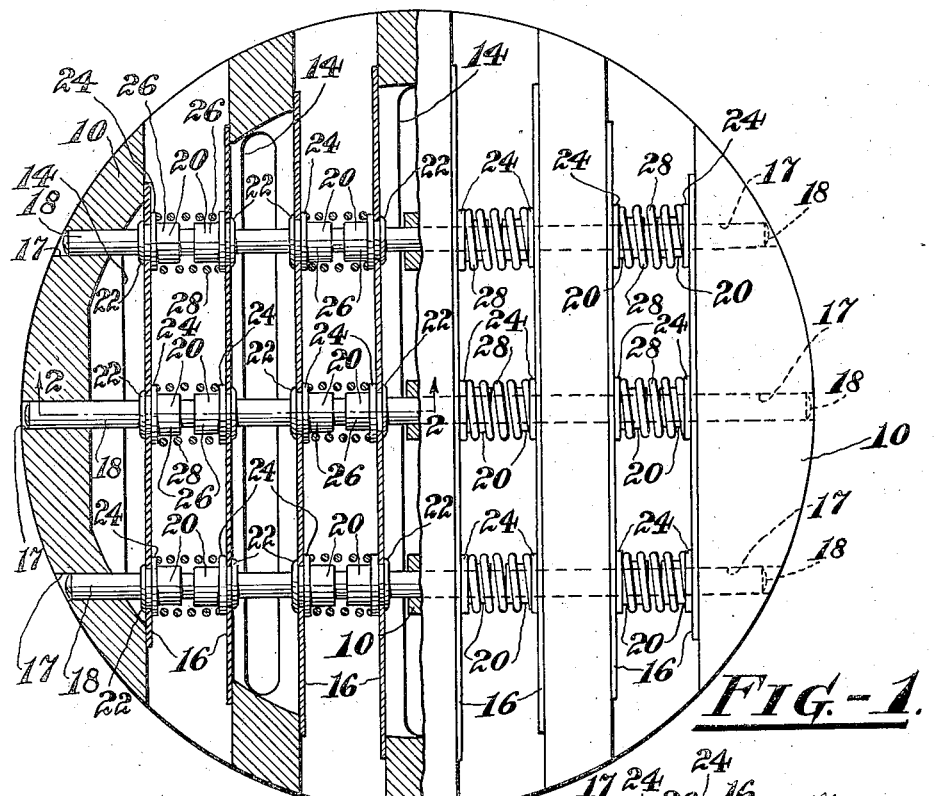
Figure 2:
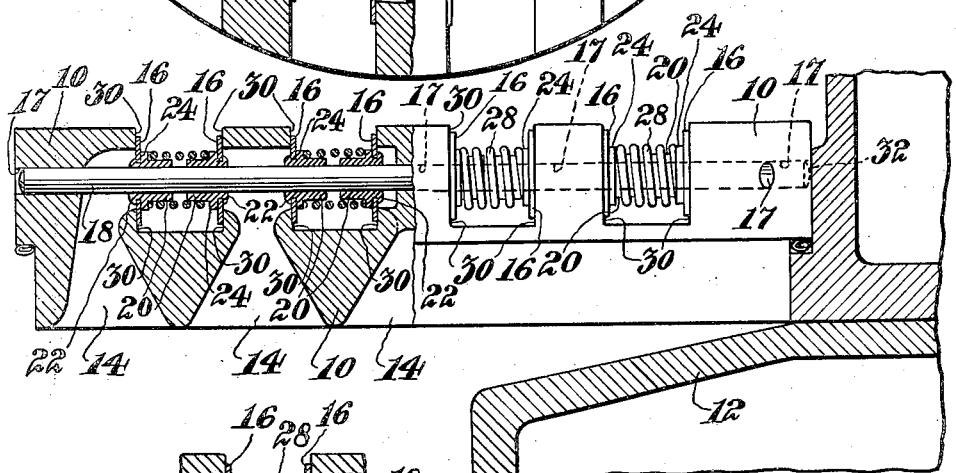
Figure 2 is a side view of Figure 1 sectioned on the line 2—2 and looking in the direction indicated by the arrows.

Referring more particularly to the drawing, 10 represents the body or valve seat of a compressor valve. In Figure 2 the valve body is shown in connection with part of the compression cylinder of an air compressor. Part of the cylinder head is indicated at 12. In the valve body or seat 10 transverse port openings 14 are formed, through which the air or other gas being compressed may pass. The port openings 14 are normally closed by plates 16. The plates 16 are held suspended and are guided in the valve seat 10 by stationary rods 18 upon which they reciprocate and said rods are placed in holes 17 drilled in the rim of the valve seat at right angles to the longitudinal direction of the port openings 14 and in the same transverse plane as the ports so that, in the assembled position, the rods extend through the ports and perpendicularly with respect thereto. Bushings 20 are securely fastened to the valve plates 16 by riveting the bushings as shown at 22. A collar 24 secures the valve plate in its proper place relative to the bushing 20 and the body portion 26 of the bushings serve as guides for springs 28 which are placed between each alternate pair of valve plates.

The method of assembling of the valve is as follows: The valve plates 16, with bushings 20 in place and riveted as at 22 with the coil springs 28 surrounding the ends 26 of the bushings 20, are held in place against the valve seats 30 by the action of the springs 28 which are somewhat compressed before the valve plates are sufficiently brought together to be placed between their respective seats. The rods 18 are then passed through the holes 17 and the valve is then ready for service. The rods 18 are prevented from falling out of the holes 17 by reason of being set below the cylinder wall as at 32.

Figure 3:
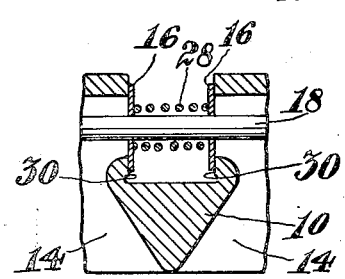
Figure 3 shows a modification in the method of mounting the valve plates.

Figure 3 shows a modification of the above method in that the bushings 20 are omitted and springs 28 only placed between the valve plates 16.

Considering this valve as a discharge valve its operation is as follows: The piston (not shown) advances from the left towards the cylinder head 12 compressing the air which has previously been drawn into the cylinder. When the pressure is sufficiently great it acts upon the valve plates 16 by way of the passages 14 forcing each alternate pair of plates closer together thus raising them from the valve seats 30 and permitting the compressed air to pass from the cylinder into a receptacle (not shown). Thus the objects above referred to are obtained.

I claim:

1. A valve, comprising in combination, a valve seat, having a plurality of ports therein, a plurality of reciprocatory plates cooperating with said ports and being adapted to be raised from said ports by pressure fluid, stationary rods extending through the ports and the plates to guide said plates and springs acting between each alternate pair of plates for normally holding each of said plates on a port.

2. A valve, comprising in combination, a valve seat having a plurality of straight ports therein, a plurality of straight rectangular plates cooperating with the ports, a plurality of rods passing through said valve seat and through said valve plates, bushings slidable on the rods and rigidly secured to said valve plates, coiled springs cooperating with the bushings in such a manner that the valve plates are normally held to the valve seat thereby, said bushings acting as stops for said valve plates when they are forced from their seats by pressure fluid.

3. A valve comprising in combination a valve seat having a plurality of ports therein, a plurality of reciprocatory plates adapted to control the flow of fluid through the ports, stationary rigid means extending through the plates and the ports to support and guide said plates and upon which the plates are slidable, and resilient means normally urging the plates to close the ports.

4. A valve seat having a plurality of ports angularly disposed to the plane of the valve seat, a plurality of movable reciprocatory plates cooperating with the ports and adapted to be lifted therefrom by pressure fluid, and stationary rods supported by the valve seat extending through the plates and the ports to guide and support the plates and upon which said plates are slidable.

5. A valve comprising in combination a valve seat having a plurality of ports therein, a plurality of reciprocatory plates arranged in pairs each plate cooperating with a port to control the flow of fluid therethrough, a plurality of stationary guide rods extending through the plates and the ports to guide the plates, and resilient means encircling the rods between each pair of plates normally urging the plates apart.

CHARLES C. HANSEN.